(12) United States Patent
Iuchi et al.

(10) Patent No.: US 9,617,441 B2
(45) Date of Patent: Apr. 11, 2017

(54) INK SET, INKJET RECORDING METHOD, AND COLORED BODY

(71) Applicant: Nippon Kayaku Kabushiki Kaisha, Tokyo (JP)

(72) Inventors: Maiko Iuchi, Tokyo (JP); Akira Kawaguchi, Tokyo (JP); Toru Ishii, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/903,265

(22) PCT Filed: Jul. 11, 2014

(86) PCT No.: PCT/JP2014/068598
§ 371 (c)(1),
(2) Date: Jan. 6, 2016

(87) PCT Pub. No.: WO2015/012133
PCT Pub. Date: Jan. 29, 2015

(65) Prior Publication Data
US 2017/0029645 A1    Feb. 2, 2017

(30) Foreign Application Priority Data

Jul. 25, 2013  (JP) ................ 2013-154509
Aug. 12, 2013  (JP) ................ 2013-167513

(51) Int. Cl.
| | | |
|---|---|---|
| B41J 2/15 | (2006.01) |
| C09D 11/40 | (2014.01) |
| C09D 11/322 | (2014.01) |
| C09D 11/03 | (2014.01) |
| B41J 2/21 | (2006.01) |

(52) U.S. Cl.
CPC ............. C09D 11/40 (2013.01); B41J 2/21 (2013.01); C09D 11/03 (2013.01); C09D 11/322 (2013.01)

(58) Field of Classification Search
CPC ..... C09D 11/322; C09D 11/40; C09D 11/324; C09D 11/101; C09D 11/037; C09D 11/32; C09D 11/326; C09D 11/30; C09D 11/02
See application file for complete search history.

(56) References Cited

U.S. PATENT DOCUMENTS

| | | | | |
|---|---|---|---|---|
| 6,468,337 B1* | 10/2002 | Gundlach | ............ | C09D 11/322 106/31.28 |
| 6,811,595 B2* | 11/2004 | Boils-Boissier | ....... | C09D 11/34 106/31.29 |
| 8,617,646 B2* | 12/2013 | Sexton | ................... | C09D 11/17 106/31.73 |
| 2005/0036021 A1 | 2/2005 | Ito et al. | | |
| 2007/0037901 A1 | 2/2007 | Kanaya et al. | | |
| 2007/0221079 A1 | 9/2007 | Aruga et al. | | |
| 2008/0070008 A1 | 3/2008 | Namba et al. | | |
| 2012/0236066 A1 | 9/2012 | Tamai et al. | | |

FOREIGN PATENT DOCUMENTS

| | | |
|---|---|---|
| CN | 102532983 A | 7/2012 |
| JP | 2003-213179 | 7/2003 |
| JP | 2004-091617 | 3/2004 |
| JP | 2005-015765 | 1/2005 |
| JP | 2005-320531 | 11/2005 |
| JP | 2005-336285 | 12/2005 |
| JP | 2006-316243 | 11/2006 |
| JP | 2007-051176 | 3/2007 |
| JP | 2008-095089 | 4/2008 |
| JP | 2012-001674 | 1/2012 |
| JP | 2012-188467 | 10/2012 |
| JP | 2012-207210 | 10/2012 |
| JP | 2013-060565 | 4/2013 |
| JP | 2013-086379 | 5/2013 |

OTHER PUBLICATIONS

Office Action in Chinese Patent Application No. 201480040064.2, dated Sep. 1, 2016.

* cited by examiner

*Primary Examiner* — Lamson Nguyen
(74) *Attorney, Agent, or Firm* — Knobbe Martens Olson & Bear LLP

(57) ABSTRACT

An ink set including at least a yellow ink, a magenta ink, a cyan ink, and a black ink and that each contain water, a surfactant, and a colorant. When each of the surfactant contents in each of the total masses of the yellow ink, the magenta ink, the cyan ink, and the black ink is represented respectively by S1, S2, S3, and S4, S1 satisfies 1.0 mass %≤S1≤2.5 mass %, S1-S2 satisfies 0.1 mass %≤S1-S2≤0.8 mass %, S3-S2 satisfies 0.0 mass %≤S3-S2≤0.5 mass %, S3-S4 satisfies 0.2 mass %≤S3-S4≤1.2 mass %, and S3 and S4 are each 0.1 mass % or more.

7 Claims, No Drawings

INK SET, INKJET RECORDING METHOD, AND COLORED BODY

CROSS-REFERENCE TO RELATED APPLICATIONS

This application is the U.S. National Phase under 35 U.S.C. §371 of International Application PCT/JP2014/068598, filed Jul. 11, 2014, which was published in Japanese as WO2015/012133 on Jan. 29, 2015, which claims priority to Japanese Patent Application No. 2013-154509, filed Jul. 25, 2013; and Japanese Patent Application No. 2013-167513, filed Aug. 12, 2013, the entire contents of which are incorporated herein by reference.

TECHNICAL FIELD

The present invention relates to an ink set, an inkjet recording method using the ink set, and a colored body colored by the ink set.

BACKGROUND ART

An inkjet recording method that is a typical method among various types of color recording methods is a method of producing small droplets of ink according to a recording signal and of attaching them to a record-receiving material to perform recording. In recent years, an inkjet technology has progressed so as to be expected to be developed to digital commercial printing, and even in the field of high-definition printing, which has been performed heretofore by silver halide photography and offset printing, the inkjet recording method has started to be employed.

In an inkjet recording method using a water-based ink, not only a record receiving material which has an ink receiving layer such as inkjet paper or ink jet glossy paper but also a record receiving material whose ink absorption capacity is low and which does not have an ink receiving layer such as general-purpose plain paper is used as a record-receiving material.

Among them, with the record-receiving material which does not have an ink receiving layer, since it is difficult for ink to penetrate, particularly when a water-based pigment ink is used, a phenomenon such as bleeding (bleed) between colors or low uniformity (mottling) of an image obtained may occur. Since recording is often performed on the record-receiving material which does not have an ink receiving layer, suppression of these phenomena is considered to be one of important problems.

In order to address the problem described above, an attempt is made to and a surfactant, a penetrating agent or a polymer into an ink to suppress the phenomena.

Patent Document 1 discloses an ink to which an anionic or nonionic surfactant and alkane diol such as 1,2-hexane diol are added and in which high-quality image without mottling and bleed can thus be realized.

Patent Document 2 discloses an ink set to which a water-soluble compound having a predetermined coefficient of hydrophilicity-hydrophobicity is added to enhance quick drying and reduce bleed.

Patent Documents 3 and 4 disclose an ink set to which a polymer is added to reduce a bleed phenomenon.

Patent Document 1: Japanese Unexamined Patent Application, Publication No. 2003-213179

Patent Document 2: Japanese Unexamined Patent Application, Publication No. 2013-86379

Patent Document 3: Japanese Unexamined Patent Application, Publication No. 2012-1674

Patent Document 4: Japanese Unexamined Patent Application, Publication No. 2012-188467

DISCLOSURE OF THE INVENTION

Problems to be Solved by the Invention

An objective of the present invention is to provide an ink set comprising at least four types of coloring inks comprising a yellow ink, a magenta ink, a cyan ink and a black ink that is not likely to cause a bleed phenomenon and a mottling phenomenon even when recording is performed on a record-receiving, material having, a low ink absorption capacity, while providing a high-quality recorded image.

Means for Solving the Problems

In order to solve the problem described above, the present inventors have performed thorough research, and have found that it is possible to solve the problem described above by adjusting the contents of surfactant contained in a yellow ink, a magenta ink, a cyan ink and a black ink to within specific ranges, leading to completion of the present invention. Specifically, the present invention relates to (1) to (7) below.

(1)

An ink set comprising at least four types of coloring inks comprising a yellow ink a magenta ink, a cyan ink and a black ink each of which comprises at least water, a surfactant and a coloring agent, wherein when contents of the surfactant in total masses of the yellow ink, the magenta ink, the cyan ink and the black ink are respectively represented as S1, S2, S3 and S4: S1 satisfies 1.0 mass %$\leq$S1$\leq$2.5 mass %; S1−S2 which is value obtained by subtracting S2 from S1 satisfies 0.1 mass %$\leq$S1−S2$\leq$0.8 mass %; S3−S2 which is a value obtained by subtracting S2 from S3 satisfies 0.0 mass$\leq$S3−S2$\leq$0.5 mass %; S3−S4 which is a value obtained by subtracting S4 from S3 satisfies 0.2 mass %$\leq$S3−S4$\leq$1.2 mass %; and S3 and S4 are at least 0.1 mass %.

(2)

An inkjet recording method, wherein a droplet of each coloring ink of the ink set comprising at least four types of coloring inks according to (1) above is discharged according to a recording signal and is attached to a record-receiving material, and thereby recording is performed.

(3)

The inkjet recording method according to (2) above, wherein the record-receiving material is an information transmission sheet.

(4)

A colored body colored by the ink set according to (1) above.

(5)

An inkjet printer wherein at least four containers respectively containing each of the coloring inks of the ink set comprising at least four types of coloring inks according to (1) above are loaded therein.

(6)

A method of suppressing a bleed phenomenon using the ink set according to (1) above.

(7)

A method of improving a mottling phenomenon using the ink set according to (1) above.

Effects of the Invention

According to the present invention, it is possinle LO provide an in set comprising at least four types of coloring inks that is not likely to cause a bleed phenomenon and a mottling phenomenon even when recording is performed on a record-receiving material having a low ink absorption capacity, while providing a high-quality recorded image.

PREFERRED MODE FOR CARRYING OUT THE INVENTION

The present invention will be described in detail below. In the present specification, "C.I." means a "color index."

In the present specification including Examples and the like, unless otherwise particularly specified, "%" and "number of parts" are mentioned based on mass. When it is not necessary to distinguish between a yellow ink, a magenta ink, a cyan ink and a black ink, it is simply described as a "coloring ink," and is assumed to include all the coloring inks.

Examples of a surfactant contained in the coloring ink include known surfactants such as an anionic surfactant, a cationic surfactant, a nonionic surfactant, an amphoteric surfactant, a silicone surfactant and a fluorine surfactant, and the like. The surfactants can be used singly or in combination.

Examples of the anionic surfactant include alkylsulfocarboxylate, α-olefin sulfonate, polyoxyethylene alkyl ether acetate, polyoxyethylene alkyl ether sulfate, N-acylamino acid or a salt thereof, N-acyl methyl taurine salt, alkyl sulfate polyoxyethylene alkyl ether sulfate, alkyl sulfate polyoxyethylene alkyl ether phosphate, rosin acid soap, castor oil sulfate, lauryl alcohol sulfate ester, alkylphenol type phosphate ester, alkyl type phosphate ester, alkylaryl sulfonate, diethyl sulfosuccinate, diethylhexyl sulfosuccinate and dioctyl sulfosuccinate. Other specific examples include HITENOL LA-10, LA-12, LA-16 and NE-15, NEO HITENOL ECL-30S and ECL-45 (product names) manufactured by Dai-ichi Kogyo Seiyaku Co., Ltd.

Examples of the cationic surfactant include 2-vinyl pyridine derivative and poly-4-vinyl pyridine derivative.

Examples of the amphoteric surfactant include lauryl dimethyl aminoacetic acid betaine, 2-alkyl-N-carboxymethyl-N-hydroxyethyl imidazolinium betaine, coconut oil fatty acid amide propyl dimethylamino acetic acid betaine, polyoctyl polyaminoethyl glycine and imidazoline derivative.

Examples of the nonionic surfactant include: ethers such as polyoxyethylene nonylphenyl ether, polyoxyethylene octylphenyl ether, polyoxyethylene dodecyl phenyl ether, polyoxyethylene oleyl ether, polyoxyethylene lauryl ether and polyoxyethylene alkyl ether; esters such as polyoxyethylene oleic acid ester, polyoxyethylene distearate ester, sorbitan laurate, sorbitan monostearate, sorbitan monooleate, sorbitan sesquioleate, polyoxyethylene monooleate and polyoxyethylene stearate; acetylene glycols (alcohols) such as 2,4,7,9-tetramethyl-5-decyne-4,7-diol, 3,6-dimethyl-4-octyne-3,6-diol and 3,5-dimethyl-1-hexyn-3-ol; product names surfynol 104, 105PG50, 82, 420, 440, 465, 485 and olfine STG manufactured by Nissin Chemical Co., Ltd.; and polyglycol ethers (such as Tergitol 15-S-7 manufactured by SIGMA-ALDRICH Co., Ltd.).

Among them, acetylene glycol-based or acetylene alcohol-based surfactant is preferable.

Examples of the silicone surfactant include polyether-modified polysiloxane, polyether-modified polydimethylsiloxane, and the like. Examples thereof include: BYK-345 and BYK-348 (manufactured by BYK Co., Ltd., polyether modified polydimethylsiioxane) represented by formula (1) below, BYK-347 (manufactured by BYK Co., Ltd., polyether-modified siloxane), BYK-349 and BYK-3455; Dynol 960 and Dynol 980 (manufactured by Air Products Co. Ltd.); and SILFACE SAG001, SILFACE SAG002, SILFACE SAG003, SILFACE SAG005, SILFACE SAG503A, SILFACE SAG008, SILFACE SAG009 and SILFACE SAG010 (manufactured by Nissin Chemical Industry Co., Ltd.).

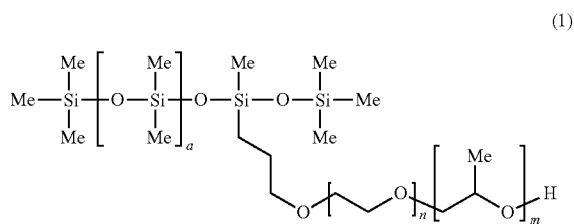

(1)

In formula (1) above, a represents an integer of 0 to 5, n represents an integer of 3 to 30 and m represents an integer of 0 to 20.

"Me" represents a methyl group.

Examples of the fluorine surfactant includes a perfluoroalkyl sulfonic acid compound, a perfluoroalkyl carboxylic acid compound, a perfluoroalkyl phosphoric acid ester compound, a perfluoroalkyl ethylene oxide adduct and a polyoxyalklene ether polymer compound having a perfluoroalkyl ether group as a side chain. Examples thereof include: Zonyl TBS, FSP, FSA, FSN-100, FSN, FSO-100, FSO, FS-300, Capstone FS-30 and FS-31 made by DuPont Co., Ltd.; PF-151N and PF-154N manufactured by OMNOVA Inc.; F-114, F-410, F-444, EXP. TF-2066, EXP. TF-2148, EXP. TF-2149, F-430, F-477, F-552, F-553, F-554, F-555, F-556, F-557 F-558, F-559, F-561, F-562, R-40, R-41, RS-72-K, RS 75, RS-76-E, RS-76-NS, RS-77, EXP. TF-1540 and EXP. TF-1760 manufactured by DIC Corporation; and BYK-3440 and BYK-3441 manufactured by BYK Co., Ltd.

Among these surfactants, the silicone surfactant and the fluorine surfactant are preferable, and with consideration given to an environmental load and the like, the silicone surfactant is more preferable.

In the present invention, the content of a surfactant contained in each of a yellow ink, a magenta ink, a cyan ink and a black ink is extremely important. Specifically, it is necessary that when the contents of the surfactants in the total masses of the yellow ink, the magenta ink, the cyan ink and the black ink are represented respectively as S1, S2, S3 and S4, S1 satisfies 1.0 mass %≤S1≤2.5 mass, S1−S2 which is a value obtained by subtracting S2 from S1 satisfies 0.1 mass %≤S1−S2≤0.8 mass %, S3−S2 whicn s a value obtained by subtracting S2 from S3 satisfies 0.0 mass %≤S3−S2≤0.5 mass % and S3−S4 which is a value obtained by subtracting S4 from S3 satisfies 0.2 mass%≤S3−S4≤1.2 mass % and S3 and S4 are at least 0.1 mass %.

When any one of these values falls outside the range described above, it is impossible to obtain effects such as the reduction of a bleed phenomenon and the improvement of a mottling phenomenon.

It should be noted that these values are presented to the first decimal place, with the second decimal place being rounded off.

As a yellow coloring agent contained in the yellow ink, a pigment is preferable. Specific examples thereof include C. I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 155, 180, 185, 193, 199 and 202. Among them, the monoazo pigments are preferable, and among them, C. I. Pigment Yellow 74 is preferable.

As the coloring agent of mHgenta to red contained in the magenta ink, a pigment is preferable. Specific examples thereof include pigments of magenta to red such as C. I. Pigment Red 5, 7, 12, 48, 48: 1, 57, 88, 112, 122, 123, 146, 149, 166, 168, 177, 178, 179, 184, 185, 202, 206, 207, 254, 255, 257, 260, 264 and 272. Among them, the quinacridone pigments are preferable, and C. I. Pigment Red 122 and/or 202 are particularly preferable.

As the coloring agent of cyan contained in the cyan ink, a pigment is preferable. Specific examples thereof include pigments of blue such as C. I. Pigment Blue 1, 2, 3, 15, 15:1, 15:2, 15:3, 15:4, 15:6, 16, 22, 25, 60, 66 and 80. Among them, the phthalocyanine pigments are preferable, and C. I. Pigment Blue 15:3 and 15:4 are particularly preferable.

As the coloring agent of black contained in the black ink, a pigment is preferable. Specific examples thereof include pigments of black such as carbon black, metal oxide, metal hydroxide, metal sulfide, metal ferrocyanide and metal chloride.

Specific examples of the carbon black include: Raven 760 ULTRA, Raven 780 ULTRA, Raven 790 ULTRA, Raven 1060 ULTRA, Raven 1080 ULTRA, Raven 1170, Raven1190 ULTRAII, Raven 1200, Raven 1250, Raven 1255, Raven 1500, Raven 2000, Raven 2500 ULTRA, Raven 3500, Raven 5000 ULTRAII, Raven 5250, Raven 5750 and Raven 7000 (manufactured by Columbia Carbon Co., Ltd.); Monarch 700, Monarch 800, Monarch 880, Monarch 900, Monarch 1000, Monarch 1100, Monarch 1300, Monarch 1400, Regal 1330R, Regal 1400R, Regal 1660R and MogulL, (manufactured by Cabot Cnrporatinn); Color Black FW1, Color Black FW2, Color Black FW18, Color Black FW200, Color Black FW285, Printex 35, Printex U, Printex Printex 140U, Printex 140V, Special Black 4, Special Black 4A, Special Black 5, Special Black 6, Nerox 305, Nerox 505, Nerox 510, Nerox 605 and Nerox 600 (manufactured by Orion engineered carbon, Inc.); and MA7, MA8, MA100, MA600, MCF-88, No. 25, No. 33, No. 40, No. 47, No. 52, No. 900 and No. 2300 (manufactured by Mitsubishi Chemical Corporation).

In order to adjust a hue etc., coloring agents such as an organic pigment, an inorganic pigment, an extender pigment and a disperse dye can further be used in mixture with the coloring agents described above.

Specific examples of the organic pigment include C. I. Pigment Violet 19, 23, 29, 37, 38 and 50.

Examples of the inorganic pigment include metal oxide, metal hydroxide, metal sulfide, metal ferrocyanide and metal chloride.

Examples of the extender pigment include silica, calcium carbonate, talc, clay, barium sulfate and white carbon. These extender pigments are not used singly, and are generally used together with an inorganic pigment or an organic pigment.

As the disperse dye, for example, known disperse dyes such as azobenzenes or anthraquinones may be used singly or two or more types thereof may be used together.

Eamples of the disperse dyes described above include the disperse dyes of yellow to orange to red to magenta and to violet such as: C. I. Disperse Yellow 9, 23, 33, 42, 49, 54, 58, 60, 64, 66, 71, 76, 79, 83, 86, 90, 93, 99, 114, 116, 119, 122, 126, 149, 160, 163, 165, 180, 183, 186, 198, 200, 211, 224, 226, 227, 231 and 237; C. I. Disperse Orange 9, 25, 29, 30, 31, 32, 37, 38, 42, 44, 45, 3, 54, 55, 56, 61, 71, 73, 76, 80, 96 and 97; C. I. Disperse Red 60, 73, 88, 91, 92, 111, 127, 131, 143, 145, 146, 152, 153, 154, 167, 179, 191, 192, 206, 221, 258 and 283; and C. I. Disperse Violet 25, 27, 28, 54, 57, 60, 73, 77, 79 and 79:1.

Likewise, examples of the disperse dye of blue to cyan include: C. I. Disperse Blue 3, 7, 9, 14, 16, 19, 20, 26, 27, 35, 43, 44, 54, 55, 56, 58, 60, 62, 64, 71, 72, 73, 75, 79, 81, 82, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330 and 333.

Likewise, examples of the disperse dyes of black include: C. I. Disperse Black 1, 3, 10 and 24.

As the coloring agents described above, pigments may be used singly. In order to, for example, adjust the hue of an image to be recorded, three or more types of organic pigments, inorganic pigments and disperse dyes may be used together.

It is also possible to use a surface processing pigment (also referred to as a self-dispersed pigment) in which a dispersibility imparting group is chemically introduced to the surface of pigment particles. Furthermore, it is also possible to use a pigment in which the surface of the pigment is partially or entirely coated with organic polymers (also referred to as a microcapsule pigment or the like).

The total contents of the coloring agents in the total masses of the coloring inks are generally 1 to 30%, preferably 1 to 10% and more preferably 2 to 7%.

Preferably, when the coloring ink is used for inkjet recording, a coloring ink is used in which the content of an inorganic impurity such as chloride for example, sodium chloride) or sulfate (for example, sodium sulfate) of a metal cation is low. In general, an inorganic impurity is often contained in a coloring agent commercially available. approximate content of an inorganic impurity is 1% or less of the total mass of the coloring agent, and the lower limit may be equal to or less than the detection limit of an analytical device, that is, 0%. As a method of obtaining a coloring agent in which the content of an inorganic impurity is low, for example, the following purification methods can be exemplified: a method using a reverse osmosis membrane; a method of suspending and agitating the dried product of the coloring agent or a wet cake in, for example, a mixed solvent of C1-C4 alcohol such as methanol and water and filtrating and separating and drying the coloring agent; and a method of exchanging and adsorbing the inorganic impurity with an ion exchange resin.

In the preparation of the coloring ink for example, ink preparation agents such as a water-soluble organic solvent, a dispersing agent, an antiseptic/fungicide agent, a pH adjusting agent, a chelating agent, a rust preventive agent, a water-soluble ultraviolet absorber, a water-soluble polymer compound, an antioxidant and a water-dispersible resin can be used as necessary.

Specific examples of the water-soluble organic solvent include: C1-C6 alkanois such as methanol, ethanol, propanol, isopropanol, butanol, isobutanol, secondary butanol, tertiary butanol, 1,2-hexanediol, 1,6-hexanediol and trimethylol propane; carboxylic acid amides such as N,N-dimethylformamide and N,N-dimethylacetamide; lactams such as 2-pyrrolidone, N-methyl-2-pyrrolidone and N-methylpyrrolidin-2-one; cyclic ureas such as 1,3-dimethylimidazolidin-2-one or 1,3-dimethyl hexahydropyrid-2-one; ketone or keto alcohol such as acetone, 2-methyl-2-hydroxy-pentane-4-one and ethylene carbonate; cyclic ether such as tetrahydrofuran and dioxane; mono, oligo or polyalkylene glycol or thioglcol having a C2-C6 alkylene unit such as ethylene glycol, diethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol and polyethylene glycol having a molecular weight of 400, 800, 1540 or more, polypropylene glycol, thiodiglycol and dithicodiglycol; polyol (triol) such as glycerin, diglycerin and hexane ,2,6-triol; C1-C4 alkyl ether of a polyhydric alcohol such as ethylene glycol monomethyl ether, ethylene glycol monoethyl ether, diethylene glycol monoethyl ether, diethylene glycol monobutyl ether (butyl carbitol, triethylene glycol monomethyl ether, triethylene glycol monoethyl ether, ethylene glycol monoallyl ether, ethylene glycol mono-isopropyl ether, diethylene glycol monomethyl ether, propylene glycol monopropyl ether and triethylene glycol monobuty ether; and γ-butyrolactone and dimethyl sulfoxide. These water-soluble organic solvents may be used singly or in combination of two or more types thereof.

Among them, isopropanol, 1,2-hexanediol, 2-pyrrolidone, N-methyl-2-pyrrolidone, 1,2-propylene glycol, glycerine, ethylene glycol monoallyl ether, ethylene glycol monoisopropyl ether, diethylene glycol monomethyl ether, propylene glycol monopropyl ether and the like are preferable.

An organic solvent that is not water-soluble may also be used, for example in such a range that layer separation or the like does not occur. Examples of such an organic solvent include C8-C16 (preferably, C8-12) alkyl having a hydroxy group and an acyloxy group. Specific examples thereof include texanol.

Specific examples of the dispersing agent include copolymers consisting of at least two monomers (preferably at least one of them is a hydrophilic monomer) selected from a group of monomers consisting of styrene and a derivative thereof; vinyl naphthalene and a derivative thereof; aliphatic alcohol ester of α, β-ethylenically unsaturated carboxylic acid and the like; acrylic acid and a derivative thereof; maleic acid and a derivative thereof; itaconic acid and a erivative thereof; fumaric acid and a derivative thereof; vinyl acetate, vinyl alcohol, vinyl pyrrolidone, acrylamide and derivatives thereof and the like. Examples of the copolymers include a block copolymer, a random copolymer, a graft copolymer and the salts thereof. The above described various copolymers, the salts thereof and the like may be used in combination of two or more types.

The weight average molecular weight of the dispersing agent is about 1000 to 30000, preferably about 1250 to 25000 and more preferably about 1500 to 20000. The acid value thereof is about 80 to 300 mg KOH/g, preferably about 90 to 275 mg KOH/g, and more preferably about. 100 to 250 mg KOH/g.

The dispersing agents are commercially available, and specific examples thereof preferably include JONCRYL 61J, 67, 68, 450, 55, 555, 586, 678, 680, 682, 683, 690; and B-36 manufactured by BASF Corporation.

Furthermore, as the dispersing agent, a random copolymer and a block copolymer obtained by performing copolymerization with a living radical polymerization method can also be used.

When the coloring ink described above contains a pigment as a coloring agent, it is preferable that a dispersing agent is further contained. The amount of dispersing agent used with respect to 1 part of a coloring agent is generally 0.1 to 1 parts, preferably 0.1 to 0.6 parts and more preferably 0.2 to 0.4 parts.

Specific examples of a reservative include compounds such as organic sulfur-based compounds, organic nitrogen sulfur-based compounds, organic halogen-based compounds, halo aryl sulfone-based compounds, iodopropargyl-based compounds, haloalkylthio-based compounds, nitrile-based compounds, pyridine-based compounds, 8-oxyquinoline compounds, benzothiazole-based compounds, isothiazoline-based compounds, dithiol-based compounds, pyridine oxide-based compounds, nitro propane-based compounds, organic tin-based compounds, phenolic compounds, quaternary ammonium salt-based compounds, triazine-based compounds, thiazine-based compounds, anilide-based compounds, adamantane-based compounds, dithiocarbamate-based compounds, brominated indanone-based compounds, benzyl bromoacetate-based compounds and inorganic salt-based compounds. Specific examples of the organic halogen based compounds include sodium pentachlorophenol. Specific examples of the pyridine oxide-based compounds include sodium 2-pyridine thiol-1-oxide. Specific examples of the isothiazoline-based compounds include 1,2-benzisothiazolin-3-One, 2-n-octyl-4-isothiazolin-3-one, 5-chloro-2-methyl-4-isothiazolin-3-one, 5-chloro-2-methyl-4-isothiazolin-3-one magnesium chloride, 5-chloro-methyl-4-isothiazolin-3-one calcium chloride and 2-methyl-4-isothiazolin-3-one calcium chloride. Specific examples of the antiseptic/fungicide agent include anhydrous sodium acetate, sodium sorbate, sodium benzoate and product names Proxel GXL (S) and Proxel XL-2 (S) manufactured by Arch Chemicals Co., Ltd.

Specific examples of the fungicide agent include sodium dehydroacetate, sodium benzoate, sodium pyridinethione-1-oxide, p-hydroxybenzoic acid ethyl ester, 1,2-benzisothiazolin-3-one and the salts thereof.

As the pH adjusting agent, an arbitrary substance can be used as long as it does not adversely affect an ink composition to be prepared and its pH can be controlled to fall within the above range. Specific examples thereof include alkanol amines such as diethanolamine, triethanolamine and N-methyl-diethanolamine; alkali metal hyaroxides such as lithium hydroxide, sodium hydroxide and potassium hydroxide; ammonium hydroxide (aqueous ammonia); alkali metal carbonates such as lithium carbonate, sodium carbonate, sodium hydrogen carbonate and potassium carbonate; alkali metal salts of organic acids such as sodium silicate and potassium acetate; and inorganic bases such as disodium phosphate.

Specific examples of the chelating agent include disodium ethylenediaminetetraacetate, sodium nitrilotriacetate, sodium hydroxyethyl ethylenediamine triacetate, sodium diethylene triamine pentaacetate and sodium uracil diacetate.

Specific examples of the rust preventive agent include acid sulfite, sodium thiosulfate, ammonium thioglycolate, diisopropyl ammonium nitrite, pentaerythritol tetranitrate and dicyclohexyl ammonium nitrite.

Specific examples of the water-soluble ultraviolet absorber include sulfonated benzophenone-based compounds, benzotriazole-based compounds, salicylic acid-based compounds, innamic acid-baseed compounds and triazine-based compounds.

Specific examples of the water-soluble polymer compound include polyethylene glycol, polyvinyl alcohol, cellulose derivative, polyamine and polyimine.

Specific examples of the antioxidant which can be used include various types of organic and metal complex-based discoloration inhibitors. Examples of the organic discoloration inhibitor include hydroquinones, alkoxy phenols, dialkoxy phenols, phenols, anilines, amines, indanes, chromans, alkox anilines and heterocycles.

The water-dispersible resin functions to fix the coloring agent in the coloring ink to the record-receiving material by coating it at room temperature. The resin used as the water-dispersible resin is not particularly limited but examples thereof include a urethane resin, a polyester resin, an acrylic resin, a vinyl acetate resin, a vinyl chloride resin, an acryi styrene resin and an acrylic silicone resin.

The water-dispersible resin is used, for example, in a state of a resin emulsion dispersed as a continuous phase in water.

Specific examples of the resin emulsion include: superflex 126, 150, 170, 210, 420, 470, 820, 830, 890 (urethane resin emulsion, manufactured by Dai-ichi Kogyo Seiyaku Co., Ltd.); hydran HW-350, HW-178, HW-163, HW-171, AP-20, AP-30, WLS-201 and WLS-210 (urethane resin emulsion, manufactured by DIC Co., Ltd.); 0569, 0850Z and 2108 (styrene-butadiene resin emulsion, manufactured by JSR Co Ltd.); and AE980, AE981A, AE982, AE986B and AE104 (acrylic resin emulsion, manufactured by E-TEC Co., Ltd.)

When the water-dispersible resin is used, the content of the water-dispersible resin in the total mass of the coloring ink is generally 0.5 to 20% and is preferably 1 to 15% in terms of solid content.

Examples of a method of preparing the coloring ink include a method in which: a dispersion liquid with the coloring agent being dispersed in water is prepared by a known method using a sand mill (also referred to as a bead mill), a roll mill, a ball mill, a paint shaker, an ultrasonic dispersion machine or a microfluidizer; a water-soluble organic solvent and, as necessary, an ink adjusting agent and the like are added thereto; and the individual components are mixed by using an agitator, a homogenizer or the like. The order of mixing of the individual components is not particularly limited.

In order to enhance preservation stability, the pH of the coloring ink is preferably 5 to 11, and is more preferably 7 to 10. The viscosity thereof is preferably equal to or less than 30 mPa·s, and is more preferably equal to or less than 20 mPa·s. The surface tension thereof is preferably 10 to 50 mN/m, and is more preferably 20 to 40 mN/m.

From the coloring ink, as necessary, foreign substances can be removed by microfiltration using a membrane filter, a glass filter or the like. When the coloring ink is used for inkjet recording, microfiltration is preferably performed. The pore diameter of a filter when microfiltration is performed is generally 1 to 0.1 μm and is preferably 0.8 to 0.1 μm.

The ink set comprising at least four types of coloring inks including a ye low ink, a magenta ink, a cyan ink and a black ink can be used in various printing fields. The ink set is preferably used as, for example, a writing aqueous ink, an aqueous printing ink, an information recording ink or a printing ink, particularly preferably used as an inkjet recording ink and preferably used in an inkjet recording method which will be described later.

The inkjet recording method is a method of discharging the droplets of the respective coloring inks in the ink set according to the recording signals thereof, attaching them to the record-receiving material and thereby performing recording. An ink nozzle and the like used in the recording are not particularly limited, and can be selected as appropriate according to the purposes.

The inkjet recording method is generally a method of using an inkjet printer to perform recording. As the discharge method for the inkjet printer, any known method may be employed. Examples thereof include: a charge control method of discharging an ink by utilizing an electrostatic attraction force; a drop-on-demand method (also referred to as a pressure pulse method) of utilizing a vibration pressure of a piezoelectric element; an acoustic inkjet method of converting an electric signal into an acoustic beam, applying it to an ink and utilizing the radiation pressure thereof to discharge the ink; and a thermal inkjet, that is, bubble-jet (registered trademark) method of heating an ink to form bubbles and utilizing the generated pressure.

It should be noted that the inkjet recording method also includes: a method of discharging a large number of inks which are referred to as photo inks, which are low in the content of the coloring agent in the ink and which have a small volume; a method of using a plurality of inks which has substantially the same hues and which differ in the content of the coloring agent in the ink to improve image quality; and a method of using together a colorless and transparent ink and an ink containing a coloring agent to enhance the stability of the coloring agent on the record-receiving material.

The colored body described above means a substance that is colored by the ink set described above, and preferable examples thereof include a record-receiving material that is colored by an inkjet recording method used in an inkjet printer.

The record-receiving material is not particularly limited but an information transmission sheet is preferable, and unabsorbent/poorly absorbent record-receiving material is particularly preferable. Specific examples thereof include coated paper, and for example, finely coated paper, art paper, coat paper, matte paper, cast paper and the like are included.

The coated paper is paper whose surface is coated with a paint to enhance aesthetic and smoothness. Examples of the paint include mixtures between various types of clays such as talc, pyrophyllite and kaolin, titanium oxide, magnesium carbonate, calcium carbonate and the like and starch, polyvinyl alcohol and the like.

The paint can be applied, for example, in a manufacturing process of paper, to paper with a coater. For the coater, there are an inline system of directly connecting the coater to a paper making machine to achieve paper making-coating in one step and an offline system of performing coating in a step separate from paper making.

The finely coated paper refers to a recording sheet in which the coated amount of paint is 12 $g/m^2$ or less. The art paper refers to a recording sheet in which high-grade recording paper (the utilization rate of high-quality paper and chemical pulp is 100%) is coated with about 40 $g/m^2$ of the paint. The coat paper and the matte paper refer to a recording sheet in which about 20 to 40 $g/m^2$ of the paint is applied. The cast paper refers to a recording sheet which is finished such that the surfaces of the art paper and the coat paper are pressurized with a machine called a cast drum to enhance the gloss and the recording effect.

The effects obtained from the present invention are extremely preferably achieved when such an unabsorbent/poorly absorbent record-receiving material is used.

Examples of the record-receiving material include: plain paper and media used in gravure printing, offset printing and like without an ink-receiving layer; inkjet specific paper, inkjet special film, glossy paper, glossy film and the like having an ink-receiving layer; fiber and cloth (cellulose, nylon, wool and the like); leather; and a base material for a color filter.

Here, among the plain paper and the like without an ink-receiving layer, there exists paper whose ink receptivity is low, as with the above described unabsorbent/poorly absorbent record-receiving materials. Even with such plain paper, the effects obtained from the present invention are extremely preferably achieved.

Preferably, when recording is performed on a record-receiving material such as an information transmission sheet by the inkjet recording method described above, for example, at least four containers containing the coloring inks in the ink set are set in predetermined positions of the inkjet printer and the recording is performed on the record-receiving material by the recording method described above.

The ink set is used together with the coloring inks of colors such as green, blue (or violet) and orange as necessary, and thus it is possible to obtain a full-color recorded image. Here, the coloring inks of the colors are injected into individual containers, and as with the container containing the ink composition described above, the individual containers are placed in predetermined positions and are used for inkjet recording.

The ink set described above is used, and thus even when not only inkjet specific paper and genera purpose plain paper but also an unabsorbent/poorly absorbent record-receiving material in which it is difficult to perform satisfactory recording with a normal ink set is used, it is possible to obtain effects such as the reduction of a bleed phenomenon and the improvement of a mottling phenomenon.

It is also possible to obtain a recorded image in which the degree of roundness of ink dots on various types or record-receiving materials is high, smoothness is achieved and luster is not degraded.

Furthermore, it s possible to obtain a recorded image in which various types of robustness such as abrasion resistance, water resistance, light resistance, heat resistance and oxidation gas resistance (for example, ozone gas resistance) are excellent.

EXAMPLES

Although the present invention will be more specifically described using examples, the present invention is not limited to the examples below.

Preparation Example 1

Preparation of Dispersion Liquid 1

11.3 parts of JONCRYL 68 (MW: 13000) and 6 parts of triethanolamine were dissolved in 95.2 parts of ion-exchanged water and were agitated for one hour. 37.5 parts of C. I. Pigment Yellow 74 (manufactured by Clariant Co., Ltd., Inkjet Yellow H5G11) was added to the obtained solution, and dispersion processing was performed with a sand grinder under conditions of 1500 rpm for 20 hours. 150 parts of ion-exchanged water was added dropwise to the obtained dispersion liquid, and thereafter this liquid was filtered to remove dispersion beads, with the result that a yellow dispersion liquid having a solid content of 18.9% was obtaned. The obtained dispersion liquid was referred to as "dispersion liquid 1."

Preparation Example 2

Preparation of Dispersion Liquid 2

A magenta dispersion liquid having a solid content of 15.8% was obtained in the same manner as Preparation Example 1 except that C. I. Pigment Yellow 74 described in Preparation Example 1 was replaced with C. I. Pigment Red 122 (manufactured by Clariant Co., Ltd., Inkjet Magenta E02). The obtained dispersion liquid was referred to as "dispersion liquid 2."

Preparation example 3

Preparation of Dispersion Liquid 3

A cyan dispersion liquid having a solid content of 18.2% was obtained in the same manner as Preparation Example 1 except that C. I. Pigment Yellow 74 described in Preparation Example 1 was replaced with C. I. Pigment Blue 15:3 (manufactured by Dainichiseika Color & Chemicals Mfg. Co., cyanine blue A220J). The obtained dispersion liquid was referred to as "dispersion liquid 3."

Preparation Example 4

Preparation of Dispersion Liquid 4

A black dispersion liquid having a solid content of 17.0% was obtained in the same manner as Preparation Example 1 except that C. I. Pigment Yellow 74 described in Preparation Example 1 was replaced with carbon black (manufactured by Orion Engineered Carbon's Corp., Nerox305). The obtained, dispersion liquid was referred to as "dispersion liquid 4."

Preparation examples 5 to 23

Preparation of Coloring Ink

Individual components des ribed in Tables 1 to 4 below were added to the dispersion liquids obtained in Preparation Examples 1 to 4, and were sufficiently agitated and mixed. Thereafter, a membrane filter having a pore size of 3 µm was used to filter foreign substances, and four types of yellow inks of coloring inks Nos. 5 to 8, five types of magenta inks of coloring inks Nos. 9 to 13, five types of cyan inks of coloring inks Nos. 14 to 18 and five types of black inks of coloring inks Nos. 19 to 23 were obtained.

The value of each component in Tables 1 to 4 means the number of parts. The remaining parts mean that pure water was added and thus the total amount of ink composition was adjusted to be 100 parts.

Examples 1 to 3

Preparation of Ink Set

Each coloring ink was selected from the four coloring inks prepared as described above such that all the ranges of "S1", "S1-S2", "S3-S2" and "S3-S4" were satisfied, and the ink sets of examples 1 to 3 were prepared. The constitutions of the ink sets in examples 1 to 3 are shown in Table 5 below.

Comparative Examples 1 to 5

Preparation of Comparative Ink Set

Each coloring ink was selected from the four coloring inks prepared as described above such that at least one of the ranges of "S1", "S1-S2", "S3-S2" and "S3-S4" was not satisfied, and the comparative ink sets of Comparative Examples 1 to 5 were prepared. The constitutions of the ink sets in Comparative Examples 1 to 5 are shown in Table 5 below.

TABLE 1

| Components | Coloring ink No. | | | |
|---|---|---|---|---|
| | 5 | 6 | 7 | 8 |
| Dispersion liquid 1 | 21 | 21 | 21 | 21 |
| Glycerin | 20 | 20 | 20 | 20 |
| Triethylene glycol | 10 | 10 | 10 | 10 |
| 1,2-hexane diol | 5 | 5 | 5 | 5 |
| BYK-349 | 0.5 | 0.8 | 1.5 | 2 |
| Proxel GXL (s) | 0.1 | 0.1 | 0.1 | 0.1 |
| Ion-exchanged water | Remaining parts | | | |
| Total | 100 | 100 | 100 | 100 |

TABLE 2

| Components | Coloring ink No. | | | | |
|---|---|---|---|---|---|
| | 9 | 10 | 11 | 12 | 13 |
| Dispersion liquid 2 | 25 | 25 | 25 | 25 | 25 |
| Glycerin | 20 | 20 | 20 | 20 | 20 |
| Triethylene glycol | 10 | 10 | 10 | 10 | 10 |
| 1,2-hexane diol | 5 | 5 | 5 | 5 | 5 |
| BYK-349 | 0.1 | 0.5 | 0.8 | 1 | 1.2 |
| Proxel GXL (s) | 0.1 | 0.1 | 0.1 | 0.1 | 0.1 |
| Ion-exchanged water | Remaining parts | | | | |
| Total | 100 | 100 | 100 | 100 | 100 |

TABLE 3

| Components | Coloring ink No. | | | | |
|---|---|---|---|---|---|
| | 14 | 15 | 16 | 17 | 18 |
| Dispersion liquid 3 | 22 | 22 | 22 | 22 | 22 |
| Glycerin | 20 | 20 | 20 | 20 | 20 |
| Triethylene glycol | 10 | 10 | 10 | 10 | 10 |
| 1,2-hexane diol | 5 | 5 | 5 | 5 | 5 |
| BYK-349 | 0.5 | 1 | 1.2 | 1.5 | 2 |
| Proxel GXL (s) | 0.1 | 0.1 | 0.1 | 0.1 | 0.1 |
| Ion-exchanged water | Remaining parts | | | | |
| Total | 100 | 100 | 100 | 100 | 100 |

TABLE 4

| Components | Coloring ink No. | | | | |
|---|---|---|---|---|---|
| | 19 | 20 | 21 | 22 | 23 |
| Dispersion liquid 4 | 24 | 24 | 24 | 24 | 24 |
| Glycerin | 20 | 20 | 20 | 20 | 20 |
| Triethylene glycol | 10 | 10 | 10 | 10 | 10 |
| 1,2-hexane diol | 5 | 5 | 5 | 5 | 5 |
| BYK-349 | 0.1 | 0.2 | 0.5 | 1 | 2 |
| Proxel GXL (s) | 0.1 | 0.1 | 0.1 | 0.1 | 0.1 |
| Ion-exchanged water | Remaining parts | | | | |
| Total | 100 | 100 | 100 | 100 | 100 |

(A) Inkjet Recording

The ink sets of the examples and Comparative Examples were used to perform inkjet recording with an inkjet printer, product name PX105 manufactured by Seiko Epson Corporation on Mitsubishi DF color GN (manufactured by Mitsubishi Paper Mills Ltd.: 127.9 g/m$^2$) serving as a record-receiving material, and thus colored bodies were obtained. In the recording on the record-receiving material, an image defined as JEITA03 was used, the obtained colored bodies were used as samples and the following evaluation tests were performed.

(B) Mottling Test

The state of mottling of each sample obtained in [(A) Inkjet recording] was visually observed, and evaluation was performed using the evaluation criteria of three stages of A to C below. The results of the evaluation were shown in Table 5 below.

A: Almost no color unevenness on the image caused by a mottling phenomenon was recognized B: Minute color unevenness on the image caused by a mottling phenomenon was visually recognized C: The image was uneven caused by a mottling phenomenon and color unevenness was remarkable (C) Bleed Test The state of bleed of each sample obtained in [(A) Inkjet recording] was visually observed, and evaluation was performed using the evaluation criteria of three stages of A to C below. The results of the evaluation were shown in Table 5 below.

A: Almost no bleeding on the image caused by a bleed phenomenon was recognized

B: Minute bleeding on the image caused by a bleed phenomenon was visually recognized.

C: Bleeding on the image caused by a bleed phenomenon was remarkable

TABLE 5

| Ink set and evaluation results | Coloring ink No. | | | | | |
|---|---|---|---|---|---|---|
| | Yellow | Magenta | Cyan | Black | Mottling | Bleed |
| Example 1 | 8 | 13 | 16 | 20 | A | A |
| Example 2 | 7 | 11 | 15 | 21 | A | A |
| Example 3 | 7 | 12 | 17 | 22 | A | B |
| Comparative Example 1 | 8 | 9 | 18 | 19 | C | C |
| Comparative Example 2 | 5 | 10 | 14 | 21 | B | C |
| Comparative Example 3 | 5 | 12 | 17 | 23 | B | C |
| Comparative Example 4 | 6 | 10 | 15 | 21 | B | C |
| Comparative Example 5 | 7 | 12 | 18 | 23 | B | C |

As is clear from the results of Table 5, in the recorded images obtained by the ink sets of examples 1 to 3, the effect of reducing the mottling and bleed phenomena was extremely high, and high quality images were obtained.

Preparation Example 24

Preparation of Dispersion Liquid 5

A block copolymer disclosed in synthesis example 3 of International Publication No. 2013/115071 was prepared, 6 parts of the polymer dispersing agent obtained was dissolved in 30 parts of 2-butanone and an even solution was obtained. A liquid obtained by dissolving 0.44 parts of sodium hydroxide in 41 parts of ion-exchanged water was added to this solution, and was agitated for one hour and an emulsification solution was prepared. Here, no crystal was precipitated. 20 parts of C. I. Pigment Yellow 74 (manufactured by Clariant Co., Ltd., Inkjet Yellow H5G11) was added to this solution, and dispersion was performed with a sand grinder. The dispersion was performed under conditions of 1500 rpm for 15 hours. Thereafter, 100 parts of ion-exchanged water was added dropwise, and filtering was performed to remove dispersion beads, and then an evaporator was used to evaporate 2-butanone and water under reduced pressure, with the result that a yellow dispersion liquid having a pigment solid content of 12.01% was obtained. The measurement of the solid content in the aqueous solution was performed with MS-70 manufactured by A&D Company Limited and was determined by a dry weight method. The pH or this liquid was 7.6, the average particle diameter of the pigment was 82 nm and the viscosity was 2.4 mPa·s. The coloring dispersion liquid obtained is referred to as "dispersion liquid 5".

Preparation Example 25

Preparation of Dispersion Liquid 6

A magenta dispersion liquid having a solid content of 11.9% was obtained in the same manner as Preparation Example 24 except that C. I. Pigment Yellow 74 described in Preparation Example 24 was replaced with C. I. Pigment Red 122 (manufactured by Clariant Co., Ltd., inkjet Magenta E02). The pH of this liquid was 8.2, the average particle diameter of the pigment was 123 nm and the viscosity was 6.8 mPa·s. The dispersion liquid obtained is referred to as "dispersion liquid 6".

Preparation Example 26

Preparation of Dispersion Liquid 7

A cyan dispersion liquid having a solid content of 11.6% was obtained in the same manner as Preparation Example 24 except that C. I. Pigment Yellow 74 described in Preparation Example 24 was replaced with C. I. Pigment Blue 15:3 (manufactured by Dainichiseika Color & Chemicals Mfg. Co., cyanine blue A220J). The pH of this liquid was 9.3, the average particle diameter of the pigment was 106 nm and the viscosity was 6.2 mPa·s. The dispersion liquid obtained is referred to as "dispersion liquid 7".

Preparation Example 27

Preparation of Dispersion Liquid 8

A black dispersion liquid having a solid content of 11.9% was obtained in the same manner as Preparation Example 24 except that C. I. Pigment Yellow 74 described in Preparation Example 24 was replaced with carbon black (manufactured by Orion Engineered Carbon's Corp., Nerox305). The pH of this liquid was 7.7, the average particle diameter of the pigment was 77 nm and the viscosity was 4.6 mPa·s. The dispersion liquid obtained is referred to as "dispersion liquid 8".

Preparation Examples 28 to 38

Preparation of Coloring Ink

Individual components described in Tables 6 to 9 below were added to the dispersion liquids obtained in Preparation Examples 24 to 27, and were sufficiently agitated and mixed. Thereafter, a membrane filter having a pore size of 3 μm was used to filter foreign substances, and two types of yellow inks of coloring inks Nos. 24 and 25, three types of magenta inks of coloring inks Nos. 26 to 28, three types of cyan inks of coloring inks Nos. 29 to 31 and three types of black inks of coloring inks Nos. 32 to 34 were obtained.

The value of each component in Tables 6 to 9 means the number of parts. The remaining parts mean that pure water was added and thus the total amount of ink composition was adjusted to be 100 parts.

TABLE 6

| | Coloring ink No. | |
|---|---|---|
| Components | 24 | 25 |
| Dispersion liquid 5 | 33 | 33 |
| Glycerin | 20 | 20 |
| Triethylene glycol | 10 | 10 |
| 1,2-hexane diol | 5 | 5 |
| BYK-349 | 2.5 | 1.0 |
| Proxel GXL (s) | 0.1 | 0.1 |
| Ion-exchanged water | Remaining parts | |
| Total | 100 | 100 |

TABLE 7

| | Coloring ink No. | | |
|---|---|---|---|
| Components | 26 | 27 | 28 |
| Dispersion liquid 6 | 33 | 33 | 33 |
| Glycerin | 20 | 20 | 20 |
| Triethylene glycol | 10 | 10 | 10 |
| 1,2-hexane diol | 5 | 5 | 5 |
| BYK-349 | 2.4 | 1.7 | 0.9 |
| Proxel GXL (s) | 0.1 | 0.1 | 0.1 |
| Ion-exchanged water | Remaining parts | | |
| Total | 100 | 100 | 100 |

TABLE 8

| | Coloring ink No. | | |
|---|---|---|---|
| Components | 29 | 30 | 31 |
| Dispersion liquid 7 | 35 | 35 | 35 |
| Glycerin | 20 | 20 | 20 |
| Triethylene glycol | 10 | 10 | 10 |
| 1,2-hexane diol | 5 | 5 | 5 |
| BYK-349 | 2.5 | 2.2 | 0.9 |
| Proxel GXL (s) | 0.1 | 0.1 | 0.1 |
| Ion-exchanged water | Remaining parts | | |
| Total | 100 | 100 | 100 |

TABLE 9

| | Coloring ink No. | | |
|---|---|---|---|
| Components | 32 | 33 | 34 |
| Dispersion liquid 8 | 34 | 34 | 34 |
| Glycerin | 20 | 20 | 20 |
| Triethylene glycol | 10 | 10 | 10 |

TABLE 9-continued

| Components | Coloring ink No. | | |
|---|---|---|---|
| | 32 | 33 | 34 |
| 1,2-hexane diol | 5 | 5 | 5 |
| BYK-349 | 2.3 | 1.2 | 0.7 |
| Proxel GXL (s) | 0.1 | 0.1 | 0.1 |
| Ion-exchanged water | Remaining parts | | |
| Total | 100 | 100 | 100 |

Examples 4 to 6

Preparation of Ink Set

Each coloring ink was selected from the four coloring inks prepared as described above such that all the ranges of "S1", "S1-S2", "S3-S2" and "S3-S4" were satisfied, and the ink sets of examples 4 to 6 were prepared. The constitutions of the ink sets in examples 4 to 6 are shown Table 10 below.

On the individual ink sets obtained, "(A) inkjet recording", "(B) Mottling test" and "(C) Bleed test" were performed. The results of the evaluation are shown in Table 10 below.

TABLE 10

| Ink set and evaluation results | Coloring ink No. | | | | | |
|---|---|---|---|---|---|---|
| | Yellow | Magenta | Cyan | Black | Mottling | Bleed |
| Example 4 | 24 | 26 | 29 | 32 | A | A |
| Example 5 | 24 | 27 | 30 | 33 | A | A |
| Example 6 | 25 | 28 | 31 | 34 | A | A |

As is clear from the results of Table 10, the ink sets of examples 4 to 6 indicated excellent effects as in Examples 1 to 3.

Preparation Examples 39 to 45

Preparation of Coloring Ink

Individual components described in Table 11 below were added to the dispersion liquids obtained in Preparation Examples 24 to 27, and were sufficiently agitated and mixed. Thereafter, a membrane filter having a pore size of 3 μm. Was used to filter foreign substances, and a yellow ink of coloring ink No. 35, two types of magenta inks of coloring inks Nos. 36 and 37, two types of cyan inks of coloring inks Nos. 38 and 39 and two types of black inks of coloring inks Nos. 40 and 41 were obtained.

The value of each component in Table 11 means the number of parts. The remaining parts mean that pure water was added and thus the total amount of ink composition was adjusted to be 100 parts.

TABLE 11

| Components | Coloring ink No. | | | | | | |
|---|---|---|---|---|---|---|---|
| | 35 | 36 | 37 | 38 | 39 | 40 | 41 |
| Dispersion liquid 5 | 33 | — | — | — | — | — | — |
| Dispersion liquid 6 | — | 33 | 33 | — | — | — | — |
| Dispersion liquid 7 | — | — | — | 35 | 35 | — | — |
| Dispersion liquid 8 | — | — | — | — | — | 34 | 34 |
| Glycerin | 20 | 20 | 20 | 20 | 20 | 20 | 20 |
| Triethylene glycol | 10 | 10 | 10 | 10 | 10 | 10 | 10 |
| 1,2-hexane diol | 5 | 5 | 5 | 5 | 5 | 5 | 5 |
| Dynol 980 | 2.5 | 2.4 | 1.7 | 2.5 | 2.2 | 2.3 | 1.3 |
| Proxel GXL (s) | 0.1 | 0.1 | 0.1 | 0.1 | 0.1 | 0.1 | 0.1 |
| Ion-exchanged water | Remaining parts | | | | | | |
| Total | 100 | 100 | 100 | 100 | 100 | 100 | 100 |

Examples 7 to 8

Each coloring ink was selected from the four coloring inks prepared as described above such that all the ranges of "S1", "S1-S2", "S3-S2" and "S3-S4" were satisfied, and the ink sets of Examples 7 to 8 were prepared. The constitutions of the ink sets in Examples 7 and 8 are shown in Table 12 below.

On the individual ink sets obtained, "(A) Inkjet recording" "(B) Mottling test" and "(C) Bleed test" were performed. The results of the evaluation are shown in Table 12 below.

TABLE 12

| Ink set and evaluation results | Coloring Ink No. | | | | | |
|---|---|---|---|---|---|---|
| | Yellow | Magenta | Cyan | Black | Mottling | Bleed |
| Example 7 | 35 | 36 | 38 | 40 | A | A |
| Example 8 | 35 | 37 | 39 | 41 | A | A |

As is clear from the results of Table 12, the ink sets of Examples 7 and 8 indicated excellent effects as in Examples 1 to 6.

INDUSTRIAL APPLICABILITY

Since the ink composition of the present invention indicates the effect of reducing a bleed Phenomenon and a mottling phenomenon, it is extremely useful as various types of recording inks, particularly an inkjet recording ink on an unabsorbent/poorly absorbent record-receiving material having no ink receiving layer.

The invention claimed is:

1. An ink set comprising at least four types of coloring inks comprising a yellow ink, a magenta ink, a cyan ink and a black ink each of which comprises at least water, a surfactant and a coloring agent, wherein, when contents of the surfactant in total masses of the yellow ink, the magenta ink, the cyan ink and the black ink are respectively represented as S1, S2, S3 and S4: S1 satisfies 1.0 mass %≤S1≤2.5 mass %; S1−S2 which is a value obtained by subtracting S2 from S1 satisfies 0.1 mass %≤S1−S2≤0.8 mass %; S3−S2 which is a value obtained by subtracting S2 from S3 satisfies 0.0 mass %≤S3−S2≤0.5 mass %; S3−S4 which is a value obtained by subtracting S4 from S3 satisfies 0.2 mass %≤S3−S4≤1.2 mass %; and S3 and S4 are at least 0.1 mass %.

2. An inkjet recording method, wherein a droplet of each coloring ink of the ink set comprising at least four types of coloring inks according to claim 1 is discharged according to a recording signal and is attached to a record-receiving material, and thereby recording is performed.

3. The inkjet recording method according to claim 2, wherein the record-receiving material is an information transmission sheet.

4. A colored body colored by the ink set according to claim 1.

5. An inkjet printer wherein at least four containers respectively containing each of the coloring inks of the ink set comprising at least four types of coloring inks according to claim 1 are loaded therein.

6. A method of suppressing a bleed phenomenon using the ink set according to claim 1.

7. A method of improving a mottling phenomenon using the ink set according to claim 1.

* * * * *

UNITED STATES PATENT AND TRADEMARK OFFICE
CERTIFICATE OF CORRECTION

PATENT NO. : 9,617,441 B2
APPLICATION NO. : 14/903265
DATED : April 11, 2017
INVENTOR(S) : Maiko Iuchi, Akira Kawaguchi and Toru Ishii It is certified that error appears in the above-identified patent and that said Letters Patent is hereby corrected as shown below:

In the Specification

Column 1, Line 36, "record receiving" should be --record-receiving--.

Column 1, Line 38, "record receiving" should be --record-receiving--.

Column 1, Line 52, "and" should be --add--.

Column 1, Line 56, after "which" insert --a--.

Column 2, Line 16, "receiving," should be --receiving--.

Column 2, Line 16, "having," should be --having--.

Column 2, Line 31 (first occurrence), "ink" should be --ink,--.

Column 2, Line 34, "wherein" should be --wherein,--.

Column 2, Line 37, after "is" insert --a--.

Column 3, Line 3, "possinle LO" should be --possible to--.

Column 4, Line 3, "polydimethylsiioxane)" should be --polydimethyl siloxane)--.

Column 4, Lines 32-33, "polyoxyalklene" should be --polyoxyalkylene--.

Column 4, Line 40, "F-557" should be --F-557,--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,617,441 B2

Column 4, Line 41, "RS 75," should be --RS-75,--.

Column 4, Line 56, "whicn s" should be --which is--.

Column 5, Line 8, "mHgenta" should be --magenta--.

Column 5, Line 37, "Cnrporatinn);" should be --Corporation);--.

Column 5, Line 40, "Printex Printex" should be --Printex V, Printex--.

Column 5, Line 64, "Eamples" should be --Examples--.

Column 6, Line 3, "3," should be --53,--.

Column 6, Line 8, "dye" should be --dyes--.

Column 6, Line 11, "82, 87," should be --82, 83, 87,--.

Column 6, Line 13, "173" should be --173,--.

Column 6, Line 36, "for" should be --(for--.

Column 6, Line 39, after "available." insert --An--.

Column 6, Line 53, (first occurrence), "ink" should be --ink,--.

Column 6, Line 61, "alkanois" should be --alkanols--.

Column 6-7, Line 67, dimethylimidazolidin" should be --dimethyl-imidazolidin--.

Column 7, Line 5, "thioglcol" should be --thioglycol--.

Column 7, Line 12, "dithicodiglycol;" should be --dithiodiglycol;--.

Column 7, Line 13, "hexane ,2,6" should be --hexane-1,2,6--.

Column 7, Line 17, "carbitol," should be --carbitol),--.

Column 7, Line 21, "monobuty" should be --monobutyl--.

Column 7, Line 44, "erivative" should be --derivative--.

Column 7, Line 55, "about." should be --about--.
Column 8, Line 4, "reservative" should be --preservative--.

CERTIFICATE OF CORRECTION (continued)
U.S. Pat. No. 9,617,441 B2

Column 8, Line 12, "isothiazoline" should be --isothiazolin--.

Column 8, Line 13, "nitro propane" should be --nitropropane--.

Column 8, Line 24, isothiazoline" should be --isothiazolin--.

Column 8, Line 25, "One," should be --one,--.

Column 8, Line 28, "5-chloro-methyl" should be --5-chloro-2-methyl--.

Column 8, Line 43, "hyaroxides" should be --hydroxides--.

Column 8, Line 63, "innamic" should be --cinnamic--.

Column 8, Line 63, "baseed" should be --based--.

Column 9, Line 6, "alkox anilines" should be --alkoxyanilines--.

Column 9, Line 13, "acryi" should be --acryl--.

Column 9, Line 22, "Co" should be --Co.,--.

Column 9, Line 54, "ye low" should be --yellow--.

Column 11, Line 27, genera purpose" should be --general-purpose--.

Column 11, Line 37, "s" should be --is--.

Column 11, Line 66, "obtaned." should be --obtained.--.

Column 12, Line 31, "Nerox305)." should be --Nerox 305).--.

Column 12, Line 32, "obtained," should be --obtained--.

Column 12, Line 39, "des ribed" should be --described--.

Column 14, Line 54, "high quality" should be --high-quality--.

Column 15, Line 13, "Company" should be --Company,--.

Column 15, Line 14, "or" should be --of--.
Column 15, Line 26, "inkjet" should be --Inkjet--.

CERTIFICATE OF CORRECTION (continued)
U.S. Pat. No. 9,617,441 B2

Column 15, Line 54, "Nerox305")." should be --Nerox 305).--.

Column 17, Line 22, "inkjet" should be --Inkjet--.

Column 17, Lines 48-49, "µm. Was" should be --µm was--.

Column 18, Lines 26-27, "recording"" should be --recording",--.

Column 18, Line 47, "Phenomenon" should be --phenomenon--.